(12) United States Patent
Bergquist et al.

(10) Patent No.: US 11,004,344 B2
(45) Date of Patent: May 11, 2021

(54) METHOD FOR VEHICLE IDENTIFICATION

(71) Applicant: VOLVO TRUCK CORPORATION, Gothenburg (SE)

(72) Inventors: Stefan Bergquist, Gothenburg (SE); Wilhelm Wiberg, Askim (SE); Petter Wirfält, Hindås (SE); Henrik Gullvén, Mölndal (SE); Fredrik Sandblom, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 110 days.

(21) Appl. No.: 16/090,252

(22) PCT Filed: Apr. 4, 2016

(86) PCT No.: PCT/EP2016/057331
§ 371 (c)(1),
(2) Date: Sep. 30, 2018

(87) PCT Pub. No.: WO2017/174108
PCT Pub. Date: Oct. 12, 2017

(65) Prior Publication Data
US 2019/0114924 A1    Apr. 18, 2019

(51) Int. Cl.
*G08G 1/00* (2006.01)
*H04W 4/46* (2018.01)
(Continued)

(52) U.S. Cl.
CPC ............... *G08G 1/22* (2013.01); *B60W 30/16* (2013.01); *G05D 1/0295* (2013.01); *G08G 1/017* (2013.01);
(Continued)

(58) Field of Classification Search
CPC ........... G08G 1/22; G08G 1/017; H04W 4/46; H04W 4/023; B60W 30/16; G05D 1/0295; H04L 67/12; B60K 23/0126
(Continued)

(56) References Cited

U.S. PATENT DOCUMENTS 8,330,621 B2   12/2012  Hayashi
8,532,862 B2 *  9/2013  Neff .................. G05D 1/0231
                                                   701/25
(Continued)

FOREIGN PATENT DOCUMENTS

CN   104471624 A    3/2015
EP     2784762 A1   10/2014
(Continued)

OTHER PUBLICATIONS

International Search Report (dated Dec. 7, 2016) for corresponding International App. PCT/EP2016/057331.
(Continued)

*Primary Examiner* — Justin M Jonaitis
(74) *Attorney, Agent, or Firm* — Venable LLP; Jeffri A. Kaminski

(57) ABSTRACT

A method is provided for vehicle identification, which method includes the steps of: an ego vehicle detecting a communicating vehicle by wireless vehicle to vehicle communication; the ego vehicle detecting a nearby vehicle by a sensor onboard the ego vehicle; the ego vehicle sending an identification request to the communicating vehicle by wireless vehicle to vehicle communication, wherein the identification request instructs the communicating vehicle to perform an action; the ego vehicle determining whether or not the nearby vehicle performed the action based at least on data from the sensor; and if the ego vehicle determines that the nearby vehicle performed the action, the ego vehicle
(Continued)

determining that the communicating vehicle and the nearby vehicle are the same vehicle.

17 Claims, 2 Drawing Sheets

(51) Int. Cl.
    *G08G 1/017*     (2006.01)
    *H04L 29/08*     (2006.01)
    *B60W 30/16*     (2020.01)
    *G05D 1/02*     (2020.01)
    *H04W 4/02*     (2018.01)

(52) U.S. Cl.
    CPC .............. *H04L 67/12* (2013.01); *H04W 4/46* (2018.02); *H04W 4/023* (2013.01)

(58) Field of Classification Search
    USPC ... 701/23, 24, 27, 28, 36, 53, 54, 58, 93, 96
    See application file for complete search history.

(56) References Cited

U.S. PATENT DOCUMENTS

| | | | | |
|---|---|---|---|---|
| 2009/0254260 A1* | 10/2009 | Nix | ...................... | G01S 15/878 701/96 |
| 2010/0256836 A1 | 10/2010 | Mudalige | | |
| 2010/0256852 A1* | 10/2010 | Mudalige | ................. | G08G 1/22 701/24 |
| 2011/0130894 A1* | 6/2011 | Kim | ..................... | G05D 1/0282 701/2 |
| 2012/0323474 A1* | 12/2012 | Breed | ................... | B60W 30/16 701/117 |
| 2013/0278441 A1* | 10/2013 | Rubin | ................... | H04L 5/0091 340/905 |
| 2014/0200760 A1* | 7/2014 | Kaufmann | ............. | G07C 5/008 701/29.3 |
| 2015/0149019 A1 | 5/2015 | Pilutti et al. | | |
| 2017/0287233 A1* | 10/2017 | Nix | ........................ | G08G 1/166 |
| 2017/0349176 A1* | 12/2017 | Alden | ............... | B60W 60/0023 |

FOREIGN PATENT DOCUMENTS

| | | | | |
|---|---|---|---|---|
| GB | 2511750 A | | 9/2014 | |
| JP | 2013168018 A | | 8/2013 | |
| JP | 2013168019 A | * | 8/2013 | ........... G08G 1/0175 |
| WO | 2014145918 A1 | | 9/2014 | |
| WO | 2017174108 A1 | | 10/2017 | |

OTHER PUBLICATIONS

Office Action dated Apr. 28, 2020 in corresponding Japanese Patent Application No. 2018-548173 (9 pages).
China Office Action dated Jan. 12, 2021 in corresponding China Patent Application No. 201680083851.4, 8 pages.

* cited by examiner

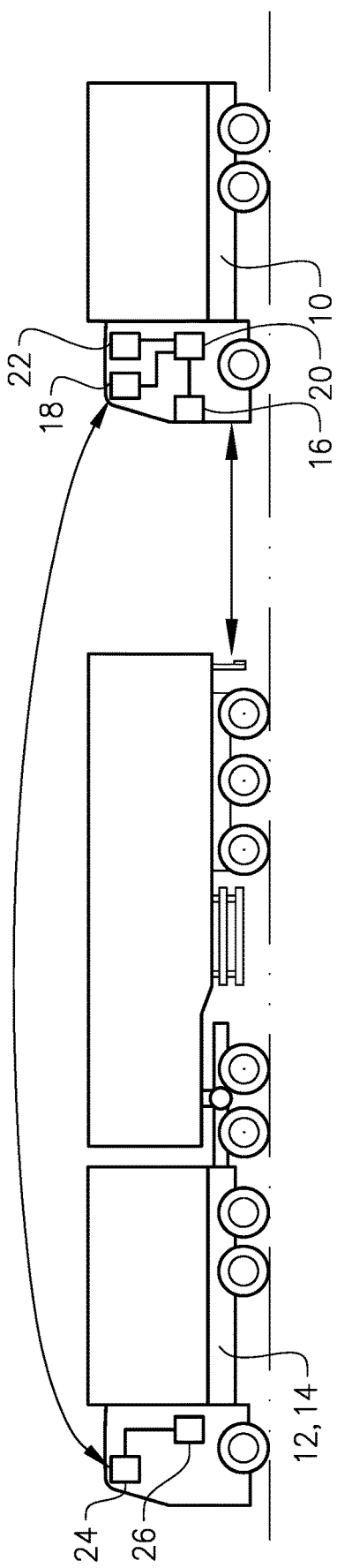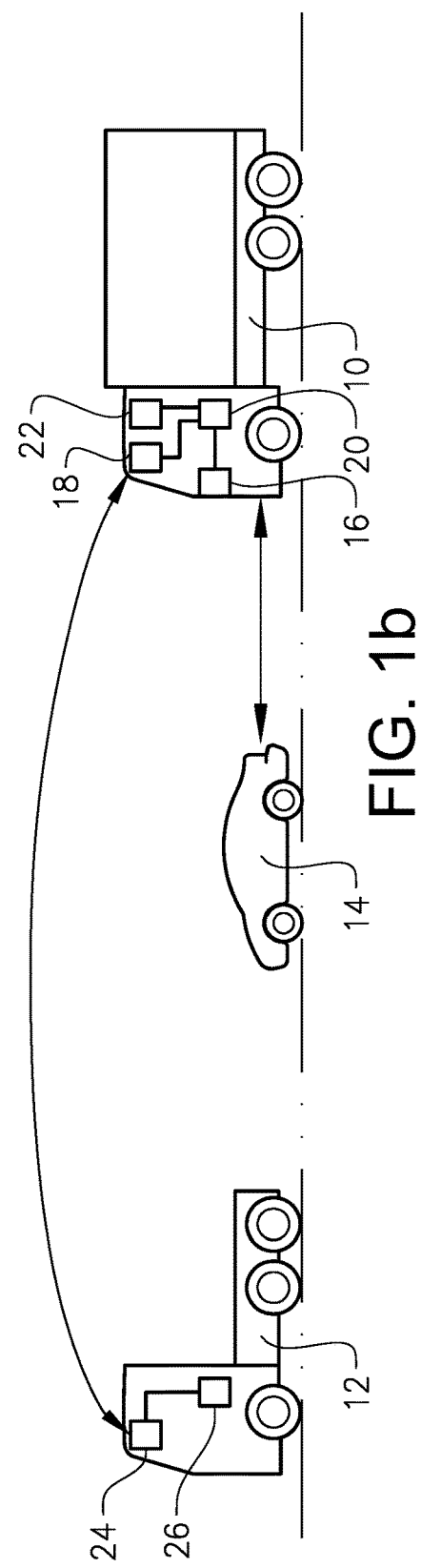

ered to detect second behavior information associated with other vehicles which drive around the self-vehicle. The vehicle specifying apparatus is configured to compare the obtained first behavior information with the detected second behavior information, thereby specifying a preceding vehicle of the self-vehicle. More specifically, an ECU compares, for example, a velocity profile of one communication vehicle based on the obtained vehicle information with a velocity profile of the preceding vehicle based on a detected inter-vehicle distance, thereby specifying whether or not there is the communication vehicle corresponding to the preceding vehicle of the self-vehicle among the communication vehicles which exist in the communicable range of the self-vehicle. However, in the longitudinal direction the changes in the behavior information are often too small in real world driving so their effect in the behavior information are often not enough to distinguish the vehicles. That is, the difference between the communication vehicle and the preceding vehicle is very small, as they may have approximately the same speed profile.

METHOD FOR VEHICLE IDENTIFICATION

BACKGROUND AND SUMMARY

The invention relates to a method for vehicle identification, for example for cooperative adaptive cruise control or platooning. The present invention also relates to a computer program, a computer readable medium, a control unit for vehicle identification, and a vehicle. The invention can be applied in heavy-duty vehicles, such as trucks and buses, but may also be used in other motored road vehicles such as cars.

In cooperative adaptive cruise control (CACC) and platooning, vehicle convoys are driven with short distances between the vehicles. To achieve this with high safety, a control algorithm receives information about the preceding vehicle by an on-board sensor (e.g. radar, camera) and information from surrounding vehicles over a wireless communication channel (so called vehicle to vehicle (V2V) communication). This information is used in the control to keep the desired following distance and to handle events such as hard braking. Since the V2V information is received with much shorter latencies (and is more accurate) than data from on-board sensors, the V2V information is needed to enable safe and/or comfortable and/or fuel efficient short distance following.

One major problem is to identify if data received from the wireless communication channel is from the directly preceding vehicle (the vehicle also seen by the radar). If this cannot be reliably detected, it is not safe to reduce the following distance since there might be another vehicle (without communication capability) between the two vehicles. In this situation, if the vehicle between the communicating vehicles would perform a hard braking, a vehicle following at close distance might not be able to apply the brakes fast enough to avoid a collision.

Shladover, Nowakowski, Lu, and Ferlis, COOPERATIVE ADAPTIVE CRUISE CONTROL (CACC) DEFINITIONS AND OPERATING CONCEPTS, TRB 2015 Annual Meeting discloses several possibilities for local coordination, including vehicle-based confirmation of following an equipped vehicle with visual or infrared camera-visible marking. One potential way to identify other equipped vehicles is to add some rear-facing line of sight marking, perhaps an IR beacon. A DSRC (dedicated short-range communications) equipped car could have this redundant communication mechanism that simply broadcasts the same identifier used in DSRC messages. The CACC following vehicles would be equipped with an IR camera, and they would be able to match the IR beacon broadcast by the lead vehicle with the DSRC message IDs received. However, this will add additional cost and it also needs a physical installation at the rear-end of the vehicle which is very problematic for trucks that often change trailers etc.

Another possibility disclosed by Shladover et al. is driver visual confirmation based on the driver visually confirming aspects of the appearance of the broadcasting target vehicle that would be contained in the broadcast data stream. However, a disadvantage of this is that driver mistakes or misuse of the system (a driver confirming the wrong target) could have serious consequences for safety.

Furthermore, EP 2784762 A1 discloses a vehicle specifying apparatus provided with: an obtaining device configured to obtain, by communication, first behavior information associated with one or a plurality of communication vehicles which drive around a self-vehicle and which can communicate with the self-vehicle; and a detecting device config- JP2013168019A discloses determining whether or not vehicles detected by a sensor matches vehicles, with which a host vehicle is in inter-vehicle communication, by determining whether or not sensor information matches information received via inter-vehicle communication.

It is desirable to provide an improved method for vehicle identification, which may overcome or at least alleviate some or all of the above-mentioned drawbacks.

According to a first aspect of the invention, there is provided a method for vehicle identification, which method comprises: an ego vehicle detecting a communicating vehicle by means of wireless vehicle to vehicle communication; the ego vehicle detecting a vehicle by means of a sensor onboard the ego vehicle; the ego vehicle sending an identification request to the communicating vehicle by means of wireless vehicle to vehicle communication, wherein the identification request instructs the communicating vehicle to perform an action; the ego vehicle determining whether or not the vehicle detected by the sensor performed said action based at least on data from said sensor; and if the ego vehicle determines that the vehicle detected by the sensor performed said action, the ego vehicle determining that the communicating vehicle and the vehicle detected by the sensor are the same vehicle.

The present invention is based on the understanding that by sending an identification request to the communicating vehicle instructing the communicating vehicle to perform an action, there can be specific information in the sensor data based on which the ego vehicle may determine whether the communicating vehicle and the vehicle detected by the sensor are the same. This makes the method very robust. There is also no need to place anything at the end of the communicating/nearby vehicle, and there is no need for driver visual confirmation. Also, there is no need to know the length of the communicating vehicle.

The method may further comprise: if the ego vehicle determines that the vehicle detected by the sensor did not perform said action, the ego vehicle determining that the communicating vehicle and the vehicle detected by the sensor are not the same vehicle.

The vehicle detected by the sensor may be a preceding vehicle directly ahead of the ego vehicle. The method may further comprise: if the ego vehicle determines that the communicating vehicle and the preceding vehicle are the same vehicle, the ego vehicle activating an automatic driver support function. Activating an automatic driver support function may include the ego vehicle initiating short distance following of the preceding vehicle, for example for cooperative adaptive cruise control or platooning. Short distance following means that the ego vehicle automatically follows the preceding vehicle at close but safe distance. The distance may for example depend on the current speed. The distance could for example be as short as 3 meters, or a time gap of 0.5 s at a speed of 90 km/h corresponding to a distance of 12.5 meters. On the other hand, if the ego vehicle determines that the communicating vehicle and the preceding vehicle are not the same vehicle, the ego vehicle may disallow short distance following of the preceding vehicle.

The sensor onboard the ego vehicle may be at least one of a radar, a lidar device, a camera, and one or more ultrasonic detectors. The one or more ultrasonic detectors may be useful in slow speeds and/or in queues.

The action may be at least one of an acceleration profile, a steering profile, and flashing at least one rear light of the communicating vehicle. The at least one rear light may for example be the brake lights of the communicating vehicle. Another action may be the communicating vehicle altering its lateral position relative to a lane marker, and this may be detected by the aforementioned camera.

The action may be predetermined. That is, the action may have been decided offline, and the identification request only tells the communicating vehicle to perform that action. Alternatively the identification request may also include a description of the action to be performed. In another alternative, the identification request may instruct the communicating vehicle to perform any action.

Determining whether or not the vehicle detected by the sensor performed said action may further be based on data received from the communicating vehicle via wireless vehicle to vehicle communication, which received data is related to the action, and wherein the ego vehicle compares the received data with data from the sensor for determining whether or not the vehicle detected by the sensor performed the action. Determining whether or not the vehicle detected by the sensor performed the action may alternatively or complementary be done by the ego vehicle comparing data from the sensor with a description of the action. If the data and the description match, the vehicles are the same. The description may be a description of the aforementioned predetermined action or the aforementioned description included in the identification request, for example.

The method may further comprise: the ego vehicle receiving information from the communicating vehicle by means of wireless vehicle to vehicle communication, said information indicating start time and end time of the performance of the action. By knowing when to look for the action, the ego vehicle may more robustly determine whether the vehicle detected by the sensor performed the action. The ego vehicle may for example compare the data from the sensor with the received data for the period defined by said start time and end time.

The method may further comprise: after detecting the communicating vehicle by means of wireless vehicle to vehicle communication, the ego vehicle performing an initial check by comparing position coordinates (for example GPS coordinates) of the ego vehicle and the communicating vehicle to determine whether the detected communicating vehicle could be the vehicle detected by the sensor. This may reduce calculation and communication.

The method may further comprise: the communicating vehicle receiving the identification request from the ego vehicle, and performing the action.

According to a second aspect, there is provided a method for vehicle identification, which method comprises: a communicating vehicle receiving an identification request from an ego vehicle by means of wireless vehicle to vehicle communication, wherein the identification request instructs the communicating vehicle to perform an action; and the communicating vehicle performing said action. This aspect may exhibit the same, similar or corresponding features and technical effects as the first aspect.

The invention also relates to a computer program comprising program code means for performing steps of the first or second aspect of the invention when said program is run on a computer.

The invention also relates to a computer readable medium carrying a computer program comprising program code means for performing steps of the first or second aspect of the invention when said program product is run on a computer.

The invention also relates to a control unit for vehicle identification, the control unit being configured to perform steps of the first or second aspect of the invention. The control unit may for example be included in the lead vehicle and/or the following vehicle.

The invention also relates to a vehicle configured to perform steps of the first or second aspect of the invention. The vehicle may be the ego vehicle or the communicating vehicle (second aspect).

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

FIGS. 1a-b are schematic side views of vehicles incorporating aspects of the present invention.

DETAILED DESCRIPTION

Figure 2:
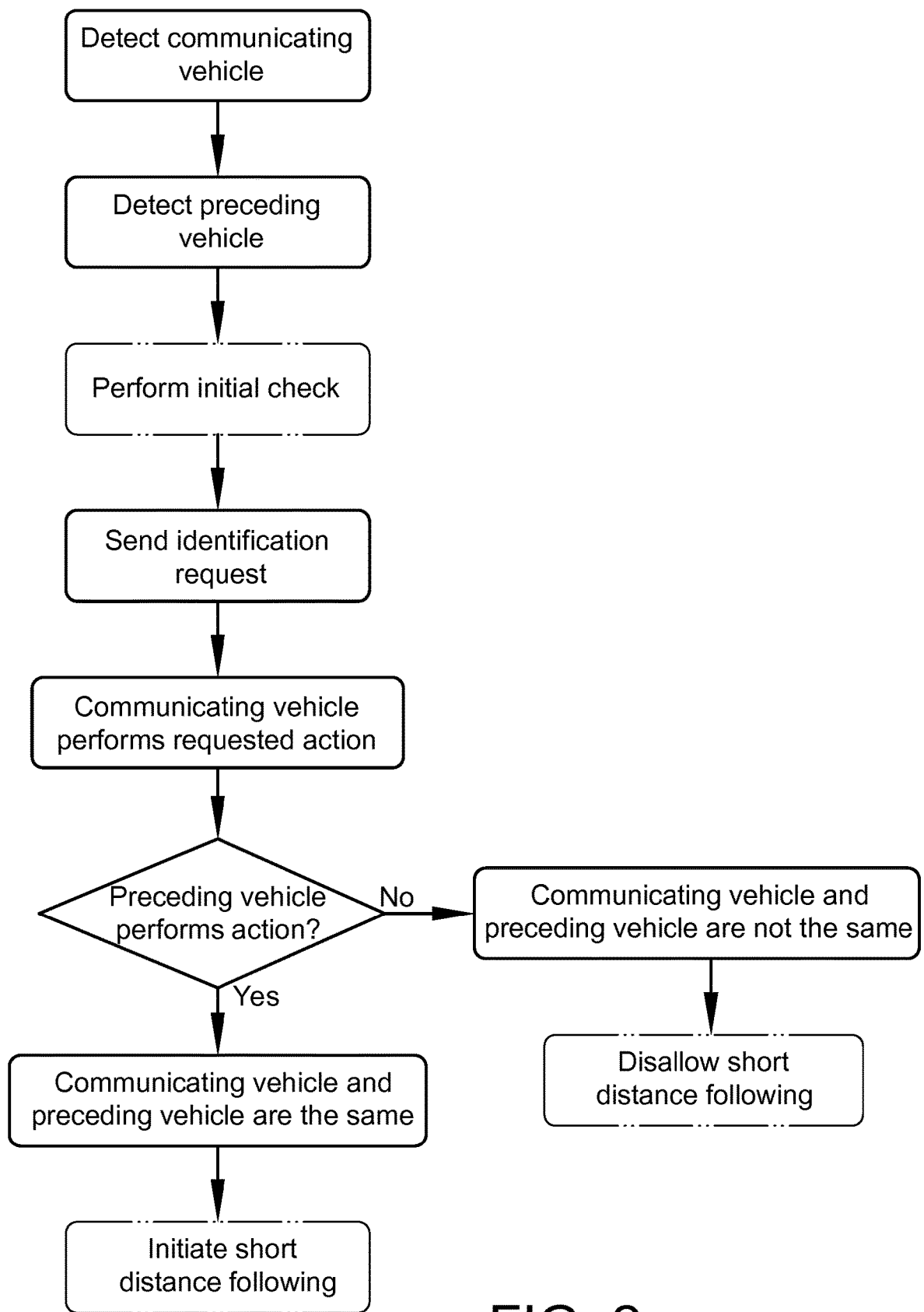
FIG. 2 is a flow chart of a method for vehicle identification according to embodiments of the present invention.

FIGS. 1a-b show a vehicle 10 and a communicating vehicle 12. The vehicle 10 may perform at least some of the steps of the present method, and is subsequently referred to as ego vehicle 10. The communicating vehicle 12 in FIG. 1a is also designated with reference sign 14, meaning that it is a preceding vehicle directly ahead of the ego vehicle 10. That is, there are no other vehicle(s) between the ego vehicle 10 and the communicating vehicle 12. The preceding vehicle 14 is typically in the same lane as the ego vehicle 10. FIG. 1b further shows another vehicle between the ego vehicle 10 and the communicating vehicle 12. The another vehicle is a preceding vehicle directly ahead of the ego vehicle 12; hence it is designated with reference sign 14 in FIG. 1b. The vehicles 10, 12, 14 may be motored road vehicle. Each vehicle 10, 12, 14 may for example be a truck (with or without trailer), a buss, a car, etc.

The ego vehicle 10 comprises an on-board sensor 16, a vehicle to vehicle communication unit 18, and an electronic control unit 20. The ego vehicle 10 may further comprise a GPS (Global Positioning System) receiver 22. The on-board sensor 16, the vehicle to vehicle communication unit 18, and the optional GPS receiver 22 may be connected to the electronic control unit 20. The on-board sensor 16 may be forward looking. The on-board sensor 16 may be a radar adapted to detect the distance to the preceding vehicle 14. The on-board sensor 16 could alternatively be a lidar device or a camera or one or more ultrasonic detectors. The vehicle to vehicle communication unit 18 allows the ego vehicle 10 to wirelessly communicate (directly) with other vehicles. The wireless communication may for example be based on WLAN. The electronic control unit 20 may perform or control various steps of the present method. The optional GPS receiver 22 is adapted to determine the location of the ego vehicle 10.

The communicating vehicle 12 also comprises a vehicle to vehicle communication unit 24 and an electronic control unit 26. The vehicle to vehicle communication unit 24 may be connected to the electronic control unit 26. By means of the vehicle to vehicle communication unit 24, the communicating vehicle 12 may broadcast various data to nearby vehicles. It can also receive data. The broadcast data may for example include the location (position coordinates, such as GPS coordinates) of the communicating vehicle 12, the acceleration of the communicating vehicle 12, the velocity of the communicating vehicle 12, etc. The electronic control unit 26 may perform or control various steps of the present method.

The preceding vehicle 14 in FIG. 1*b* is not equipped with any vehicle to vehicle communication unit.

With further reference to FIG. 2, a method for vehicle identification according to an embodiment of the present invention may be initiated by the ego vehicle 10 detecting the communicating vehicle 12 by means of wireless vehicle to vehicle communication. That is, the vehicle to vehicle communication unit 18 of the ego vehicle 10 picks up data broadcast from the communicating vehicle 12, allowing the ego vehicle 10 to detect the presence of the communicating vehicle 12.

The ego vehicle 10 also detects the preceding vehicle 14 by means of the on-board sensor 16. The preceding vehicle 14 vehicle may be detected before, after, or at the same time as the communicating vehicle 12 is detected. In this embodiment, the on-board sensor 16 is a radar which detects the preceding vehicle 14 by detecting a distance to the preceding vehicle 14.

The ego vehicle 10 may optionally perform an initial check to determine whether the detected communicating vehicle 12 and the detected preceding vehicle 14 could be same vehicle. This may be done by comparing position coordinates of the ego vehicle 10 and the communicating vehicle 12. The position coordinates of the ego vehicle 10 are provided by the GPS receiver 22, and the position coordinates of the communicating vehicle 12 come from the data broadcast by the communicating vehicle 12 and picked up by the vehicle to vehicle communication unit 18 of the ego vehicle. If the communicating vehicle 12 is far away (for example more than approximately 150 meters away) or behind the ego vehicle 10, it may be concluded that the communicating vehicle 12 cannot be a preceding vehicle directly ahead of the ego vehicle 10, and the method may be stopped. If the communicating vehicle 12 is not far away or behind the ego vehicle 10, the method may continue.

The ego vehicle 10 then sends an identification request to the communicating vehicle 12 by means of wireless vehicle to vehicle communication, i.e. using the vehicle to vehicle communication unit 18. The identification request includes an instruction instructing the communicating vehicle 12 to perform a predetermined action. The predetermined action has been decided offline, and the identification request only tells the communicating vehicle 12 to perform that action. The action may be a maneuver to be automatically performed by the communicating vehicle 12. In this embodiment, the predetermined action to be performed is a longitudinal acceleration profile.

Having received the identification request from the ego vehicle 10 (via the vehicle to vehicle communication unit 24), the communicating vehicle 12 automatically performs the requested action, i.e. accelerates according to the acceleration profile. The communicating vehicle 12 may also send information to the ego vehicle 10, which information indicates start time and end time of the performance of the predetermined action. The information is communicated by means of wireless vehicle to vehicle communication.

The ego vehicle 10 then determines whether or not the preceding vehicle 14 performed the predetermined action that the communicating vehicle 12 was requested to perform. To this end, the ego vehicle 10 receives data from the communicating vehicle 12 via wireless vehicle to vehicle communication, which data is related to the predetermined action. In this embodiment, where the predetermined action is an acceleration profile, the received data includes acceleration and velocity of the communicating vehicle 12. To determine whether the preceding vehicle 14 performed the predetermined action, the ego vehicle 10 compares the received data with data from the on-board sensor 16 for the period defined by aforementioned start and end times. That is, the ego vehicle 10 compares the received acceleration and velocity of the communicating vehicle 12 with any varying distance to the preceding vehicle detected by the on-board sensor 16 for the period when the action is or was performed. If the data match, the ego vehicle 10 determines that the preceding vehicle 14 did perform the predetermined action, whereby the ego vehicle 10 concludes that the communicating vehicle 12 and the following vehicle 14 are the same (FIG. 1*a*). On the other hand, if the data do not match, the ego vehicle 10 determines that the preceding vehicle 14 did not perform the predetermined action, whereby the ego vehicle 10 concludes that the communicating vehicle 12 and the following vehicle 14 are not the same (FIG. 1*b*).

In the former case, the ego vehicle 10 may activate an automatic driver support function, such as initiating short distance following of the preceding vehicle 12,14 (FIG. 1*a*) for cooperative adaptive cruise control or platooning. In the latter case (FIG. 1*b*), short distance following of the preceding vehicle 14 may be disallowed, for safety reasons.

Having determined that the communicating vehicle 12 and the following vehicle 14 are the same, the ego vehicle 10 could also send a message via vehicle to vehicle communication to the communicating vehicle 12 instructing it to for example flash its rear lights so that the driver of the ego vehicle 10 gets a confirmation that short distance following is initiated.

In another embodiment, the on-board sensor 16 is a camera and the action to be performed by the communicating vehicle 12 is the communicating vehicle 12 flashing its brake lights. As in the previous embodiment, the method may be initiated by the ego vehicle 10 detecting the communicating vehicle 12 by means of wireless vehicle to vehicle communication. The ego vehicle 10 also detects the preceding vehicle 14 by means of the camera 16.

The ego vehicle 10 then sends an identification request to the communicating vehicle 12 by means of wireless vehicle to vehicle communication. The identification request includes an instruction instructing the communicating vehicle 12 to perform an action. The identification request also includes a description of the action to be performed. As mentioned above, the action is here flashing the braking lights of the communicating vehicle 12.

Having received the identification request from the ego vehicle 10, the communicating vehicle 12 automatically performs the requested action.

The ego vehicle 10 determines whether or not the preceding vehicle 14 performs the action that the communicating vehicle 12 was requested to perform based on data from the camera 16, by comparing data from the camera 16 with the description of the action. Namely, the signal picked up by the camera 16 is analyzed to determine whether the preceding vehicle 14 flashes its braking lights as described in the identification request. That is, the ego vehicle compares data from the camera 16 with the description of the action. If yes, the ego vehicle 10 concludes that the communicating vehicle 12 and the following vehicle 14 are the same (FIG. 1*a*). If no, the ego vehicle 10 concludes that the communicating vehicle 12 and the following vehicle 14 are not the same (FIG. 1*b*). It should be noted that also in this embodiment the ego vehicle 10 may perform the aforementioned initial check, and/or analyze the signal from the camera 16 for the period when the action was performed based on information from the communicating vehicle 12.

In yet another embodiment of the present method, the ego vehicle 10 sends an identification request to the communicating vehicle 12 by means of wireless vehicle to vehicle communication, which identification request includes an instruction instructing the communicating vehicle 12 to perform any action.

Having received the identification request from the ego vehicle 10, the communicating vehicle 12 may select to automatically alter its lateral position relative to a lane marker. Simultaneously, the communicating vehicle 12 broadcasts data indicating its lateral position relative to the lane marker.

The sensor 16 of the ego vehicle 10, in this case a camera, detects the lateral position relative to a lane marker of the preceding vehicle 14. If the lateral position relative to the lane marker broadcast from the communicating vehicle 12 matches the lateral position relative to the lane marker detected by the camera, the ego vehicle 10 determines that the communicating vehicle 12 and the following vehicle 14 are the same (FIG. 1*a*). If no, the ego vehicle 10 determines that the communicating vehicle 12 and the following vehicle 14 are not the same (FIG. 1*b*). Also in this embodiment the ego vehicle 10 may perform the aforementioned initial check, and/or analyze the signal from the camera 16 for the period when the action was performed based on information from the communicating vehicle 12.

It is to be understood that the present invention is not limited to the embodiments described above and illustrated in the drawings; rather, the skilled person will recognize that many changes and modifications may be made within the scope of the appended claims.

For example, the vehicle 14 detected by the sensor could alternatively be alongside or behind the ego vehicle 10, and the on-board sensor 16 could be a 360° radar. In case the vehicle 14 detected by the sensor is behind the ego vehicle 10, the ego vehicle 10 may be a lead vehicle (of for example a platoon).

Furthermore, the present invention could be used with other automatic driver support functions, such as forward collision warning, advanced emerging braking system, etc.

Furthermore, when the ego vehicle has determined that the communicating vehicle and the vehicle detected by the sensor are the same vehicle, sensor data from the communicating vehicle could be relayed from the communicating vehicle to the ego vehicle. In this way, the ego vehicle may detect an object that is visible for a sensor of the communicating vehicle but not for the sensor of the ego vehicle.

Furthermore, for example in CACC or platooning, when the ego vehicle has determined that the communicating vehicle and the vehicle detected by the sensor are the same vehicle, the communicating/preceding vehicle may control the ego vehicle (accelerate/decelerate and/or steer left/right).

The invention claimed is:

1. A method for vehicle identification, the method comprising the: an ego vehicle detecting a communicating vehicle by wireless vehicle to vehicle communication; the ego vehicle detecting a vehicle by a sensor onboard the ego vehicle; the ego vehicle sending an identification request to the communicating vehicle by wireless vehicle to vehicle communication, wherein the identification request instructs the communicating vehicle to perform an action; the communicating vehicle sending information indicating a start time and an end time of the performance of the action; the ego vehicle receiving the information indicating the start time and the end time of the performance of the action from the communicating vehicle by wireless vehicle to vehicle communication; the ego vehicle determining whether or not the vehicle detected by the sensor performed the action based at least on data from the sensor and the information; and if the ego vehicle determines that the vehicle detected by the sensor performed the action, the ego vehicle determining that the communicating vehicle and the vehicle detected by the sensor are the same vehicle.

2. A method according to claim 1, further comprising: if the ego vehicle determines that the vehicle detected by the sensor did not perform the action, the ego vehicle determining that the communicating vehicle and the vehicle detected by the sensor are not the same vehicle.

3. A method according to claim 1, wherein the vehicle detected by the sensor is a preceding vehicle directly ahead of the ego vehicle.

4. A method according to claim 3, further comprising: if the ego vehicle determines that the communicating vehicle and the preceding vehicle are the same vehicle, the ego vehicle activating an automatic driver support function.

5. A method according to claim 4, wherein the ego vehicle activating an automatic driver support function includes the ego vehicle initiating short distance following of the preceding vehicle.

6. A method according to claim 2, wherein the vehicle detected by the sensor is a preceding vehicle directly ahead of the ego vehicle, the method further comprising: if the ego vehicle determines that the communicating vehicle and the preceding vehicle are not the same vehicle, the ego vehicle disallowing short distance following of the preceding vehicle.

7. A method according to claim 1, wherein the sensor onboard the ego vehicle is at least one of a radar, a lidar device, a camera, and one or more ultrasonic detectors.

8. A method according to claim 1, wherein the action is at least one of an acceleration profile, a steering profile, and flashing at least one rear light of the communicating vehicle.

9. A method according to claim 1, wherein the action is predetermined.

10. A method according to claim 1, wherein determining whether or not the vehicle detected by the sensor performed the action is further based on data received from the communicating vehicle via wireless vehicle to vehicle communication, which received data is related to the action, and wherein the ego vehicle compares the received data with data from the sensor for determining whether or not the vehicle detected by the sensor performed the action.

11. A method according to claim 10, wherein the ego vehicle compares the data from the sensor with the received data for the period defined by the start time and end time.

12. A method according to claim 1, further comprising: after detecting the communicating vehicle by wireless vehicle to vehicle communication, the ego vehicle performing an initial check by comparing position coordinates of the ego vehicle and the communicating vehicle to determine whether the detected communicating vehicle could be the vehicle detected by the sensor.

13. A method according to claim 1, further comprising: the communicating vehicle receiving the identification request from the ego vehicle, and performing the action.

14. A computer comprising a computer program for performing the steps of claim 1 when the program is run on the computer.

15. A non-transitory computer readable medium carrying a computer program for performing the steps of claim 1 when the program product is run on a computer.

16. An electronic control unit for vehicle identification, the control unit being configured to perform the steps of the method according to claim 1.

17. A vehicle configured to perform the steps of the method according to claim 1.

* * * * *